United States Patent
Zoppas et al.

(10) Patent No.: US 9,186,841 B2
(45) Date of Patent: Nov. 17, 2015

(54) BLOW MOULD

(75) Inventors: Matteo Zoppas, Conegliano (IT); Luigino Bischer, Conegliano (IT); Massimo Coran, Spresiano (IT); Tair Hafid, Ceggia (IT)

(73) Assignee: S.I.P.A. SOCIETA' INDUSTRIALIZZAZIONE PROGETTAZIONE E AUTOMAZIONE S.P.A., Vittorio Veneto (IT)

( * ) Notice: Subject to any disclaimer, the term of this patent is extended or adjusted under 35 U.S.C. 154(b) by 10 days.

(21) Appl. No.: 14/008,135

(22) PCT Filed: Mar. 30, 2012

(86) PCT No.: PCT/EP2012/055791
§ 371 (c)(1),
(2), (4) Date: Sep. 27, 2013

(87) PCT Pub. No.: WO2012/131039
PCT Pub. Date: Oct. 4, 2012

(65) Prior Publication Data
US 2014/0017353 A1    Jan. 16, 2014

(30) Foreign Application Priority Data
Mar. 30, 2011 (IT) .............................. RM2011A0165

(51) Int. Cl.
*B29C 49/48* (2006.01)
*B29C 33/30* (2006.01)
*B29C 49/56* (2006.01)
*B29C 49/06* (2006.01)

(52) U.S. Cl.
CPC .............. *B29C 49/56* (2013.01); *B29C 33/305* (2013.01); *B29C 49/48* (2013.01); *B29C 49/06* (2013.01); *B29C 2049/4858* (2013.01); *B29C 2049/4889* (2013.01)

(58) Field of Classification Search
CPC ..................... B29C 33/305; B29C 2049/4889; B29C 2049/4858; B29C 49/48; B29C 49/56; B29C 49/06
See application file for complete search history.

(56) References Cited

U.S. PATENT DOCUMENTS

| 2,984,176 | A | * | 5/1961 | Sommer et al. ............ 83/698.71 |
| 8,758,001 | B2 | * | 6/2014 | Pasquier et al. ................ 425/182 |
| 8,770,961 | B2 | * | 7/2014 | Duclos ........................ 425/195 |
| 8,894,404 | B2 | * | 11/2014 | Meinzinger et al. .......... 425/214 |
| 2006/0233909 | A1 | | 10/2006 | Perez et al. |
| 2009/0136613 | A1 | * | 5/2009 | Linke et al. ................... 425/541 |
| 2012/0034331 | A1 | * | 2/2012 | Dorrmann .................... 425/538 |
| 2014/0010910 | A1 | * | 1/2014 | Zoppas et al. ................ 425/541 |

FOREIGN PATENT DOCUMENTS

| DE | 10 2009 050637 A1 | 11/2010 |
| WO | WO 2011/026828 A1 | 3/2011 |
| WO | WO 2011/026980 A1 | 3/2011 |

* cited by examiner

*Primary Examiner* — Robert B Davis
(74) *Attorney, Agent, or Firm* — Davis, Malm & D'Agostine, P.C.

(57) ABSTRACT

A blow mold (1) provided with a locking system to lock each half-mold (2) to the respective half-mold holder (3), allowing simpler and quicker replacement of the lateral half-impressions (4) of the mold (1). The blow mold (1) provides that the lateral half-impression (4) of each half-mold (2) is fixed in a cavity of the corresponding mold holder (3) by means of actuating at least one quick coupling device (5, 5'). Said quick coupling device (5, 5') comprises a force multiplier mechanism (22, 22') configured so as to actuate a respective locking element (29, 29') from an unlocking position, in which the half-mold (2) or a part thereof may be extracted from the mold holder (3), to a locking position, in which half-mold (2) and mold holder (3) are integrally locked to each other, or vice versa.

8 Claims, 15 Drawing Sheets

BLOW MOULD

FIELD OF THE INVENTION

The present invention relates to a blow mould or stretch-blow mould of at least one preheated preform, made of thermoplastic material, for the production of containers; the mould being provided with a quick coupling system for fixing the half-impression of each lateral half-mould to the respective half-mould holder.

STATE OF THE ART

Generally, the two lateral half-moulds of a blow mould, for the production of containers made of thermoplastic material, are removably fixed to the respective half-mould holders whereby said half-moulds may be replaced, without the need of having to replace the entire moulding device, in the event of damage or wear or, above all, in the event that it is necessary to produce containers of different shapes and/or sizes.

In this known solution, each half-mould is extremely heavy, e.g. around 20 kg for a steel mould. The fixing means must be capable of supporting this weight and comprise many nut-screw joints and/or threaded joints. Moreover, each half-mould is provided with ducts for the circulation of one or more fluids for cooling and/or heating the walls of the half-impression obtained in the inner cavity of the half-mould. Said ducts are connected to fluid feed pipes with joints for connection to the half-mould. Therefore, replacing each half-mould also involves the disconnection and subsequent re-connection of the respective pipe joints.

All these aspects cause extremely long replacement times of the two half-impressions in a blow mould, which may reach around 10 minutes per mould.

A solution to this problem was obtained by means of the blow mould described in the document EP0821641.

This blow mould consists of two lateral half-moulds, each supported by a half-mould holder, the two half-mould holders being movable with respect to each other.

The quick coupling device used in this solution, although lowering half-impression replacement times to 5 minutes, continues to not satisfy the needs of the current market, above all for modern blow moulding machines having a large number of moulds. Moreover, a further disadvantage is represented by the fact that it is always necessary to use external tools for the disassembly and assembly of said half-impressions. Indeed, even if so-called quick coupling devices are used, a predetermined number of screws has to be loosened in order to allow the half-mould locking tabs to be moved radially outwards, enabling the extraction thereof. Subsequently, said predetermined number of screws must be tightened again once the half-impression has been changed, in order to allowing locking of the half-mould by means of the aforementioned tabs moved radially towards the inside of the mould in corresponding flat seats, provided in the separation or contact surface of the half-mould.

The need is therefore felt to provide a blow mould provided with a quick coupling system for the lateral half-impressions which allows the aforementioned drawbacks to be overcome.

SUMMARY OF THE INVENTION

The primary object of the present invention is to provide a blow mould provided with a locking system to lock each half-mould to the respective half-mould holder, allowing simpler and quicker replacement of the lateral half-impressions of the mould.

A further object of the invention is to provide a blow mould in which it is no longer necessary to use external tools to remove and replace said half-impressions, due to the presence of a force multiplier mechanism.

The present invention, therefore, proposes to achieve the objects discussed above by providing a blow mould for plastic containers which, in accordance with claim 1, comprises:

- at least two half-moulds,
- at least two half-mould holders, each half-mould holder supporting one of said half-moulds, each half-mould holder and each half-mould defining respective complementary coupling surfaces between half-mould holder and half-mould,
- at least one quick coupling device to lock each half-mould to the respective half-mould holder, wherein said at least one quick coupling device is fixed to the respective half-mould holder and comprises a locking element and a force multiplier mechanism, wherein said locking element can move, by means of actuating said force multiplier mechanism, from an unlocking position to a locking position in which the locking element interacts with at least the respective half-mould, whereby half-mould and respective half-mould holder are locked to each other in a position in which the respective complementary coupling surfaces are coupled to each other, and wherein said force multiplier mechanism remains cinematically fixed to the quick coupling device both in said unlocking position and in said locking position. The blow mould, object of the present invention, comprises two lateral half-elements, each lateral half-element in turn comprising a half-mould supported by a half-mould holder.

Advantageously, the blow mould of the invention provides that the half-impression of each lateral half-mould is fixed with respect to the corresponding half-mould holder by means of actuating at least one quick coupling device. Said quick coupling device may also be provided in the event that the mould provides for the presence of a mould bottom which is distinct (separate) from the two lateral half-moulds, called bottom plate or base plate in technical jargon and comprising the bottom impression of the container to be blown.

Said at least one quick coupling device comprises a force multiplier mechanism, including at least one first lever, configured to multiply a first force applied, also simply manually, on said first lever in order to obtain a second force, denominated locking force, which is much greater than said first force, in order to safely lock the lateral half-mould with the relative half-mould holder.

Said force multiplier mechanism is configured so as to actuate a respective locking element from an unlocking position, in which the half-mould or a part thereof can be extracted from the half-mould holder, to a locking position, in which half-mould and half-mould holder are integrally locked to each other, or vice versa.

Advantageously the quick coupling device, together with all components thereof, is fixed to a wall of the half-mould holder and, in particular, the force multiplier mechanism remains cinematically fixed to the quick coupling device both in said unlocking position and in said locking position.

The force multiplier mechanism can comprise, for example, a locking system with hinged levers or simply locking linkage. Said system includes a first control lever, firmly hinged to the respective half-mould holder. In particular, said lever can be firmly hinged to a support element integrally fixed to a sidewall of the half-mould holder. This advantageously allows the operator to not have to use further tools, e.g. an external lever which is not part of the quick coupling device integral with the mould, for the disassembly and assembly of the lateral half-moulds and the respective half-impressions. Indeed, the disassembly or assembly operation which provides for the use of external levers requires more time inasmuch as the operator must equip himself with said lever and insert it into the quick coupling device, the latter operation not being immune from further losses of time in the event that the insertion is not achieved at the first attempt or the lever falls to the ground and must be retrieved and inserted again. The fact of providing the entire quick coupling device fixed to the respective half-mould holder allows the operations of replacing the lateral half-impressions of the mould to be further accelerated.

In a first advantageous embodiment, both the force multiplier mechanism and the respective locking element are positioned so as to not interfere at all with the contact walls of the respective half-mould holder and half-mould. By contact walls of a half-mould holder and relative lateral half-mould it is meant those internal walls or edges which, once the blow mould is closed, adhere to the corresponding internal walls or edges of the opposing half-mould holder and relative half-mould, defining a plane of contact between the two lateral half-elements of the mould, leaving as a non-contact zone between said two half-elements at least the empty zone corresponding to the internal volume of the container to be moulded.

In a second advantageous embodiment, instead, both the force multiplier mechanism and the respective locking element are positioned so as to interfere with the contact walls of the respective half-mould holder and half-mould or exclusively with the contact wall of the respective half-mould.

The blow mould of the invention allows the replacement times of the two lateral half-impressions of the mould to be reduced to around 1 minute, thus reducing the replacement time in a blowing machine with several blowing stations.

The dependent claims describe preferred embodiments of the invention.

BRIEF DESCRIPTION OF THE FIGURES

Further features and advantages of the invention will become clearer in light of the detailed description of preferred but not exclusive embodiments of a blow mould, shown by way of non-limiting example with the aid of the attached drawings in which.

Equal reference numbers in the figures identify the same elements or components.

DETAILED DESCRIPTION OF PREFERRED EMBODIMENTS OF THE INVENTION

Figure 1:
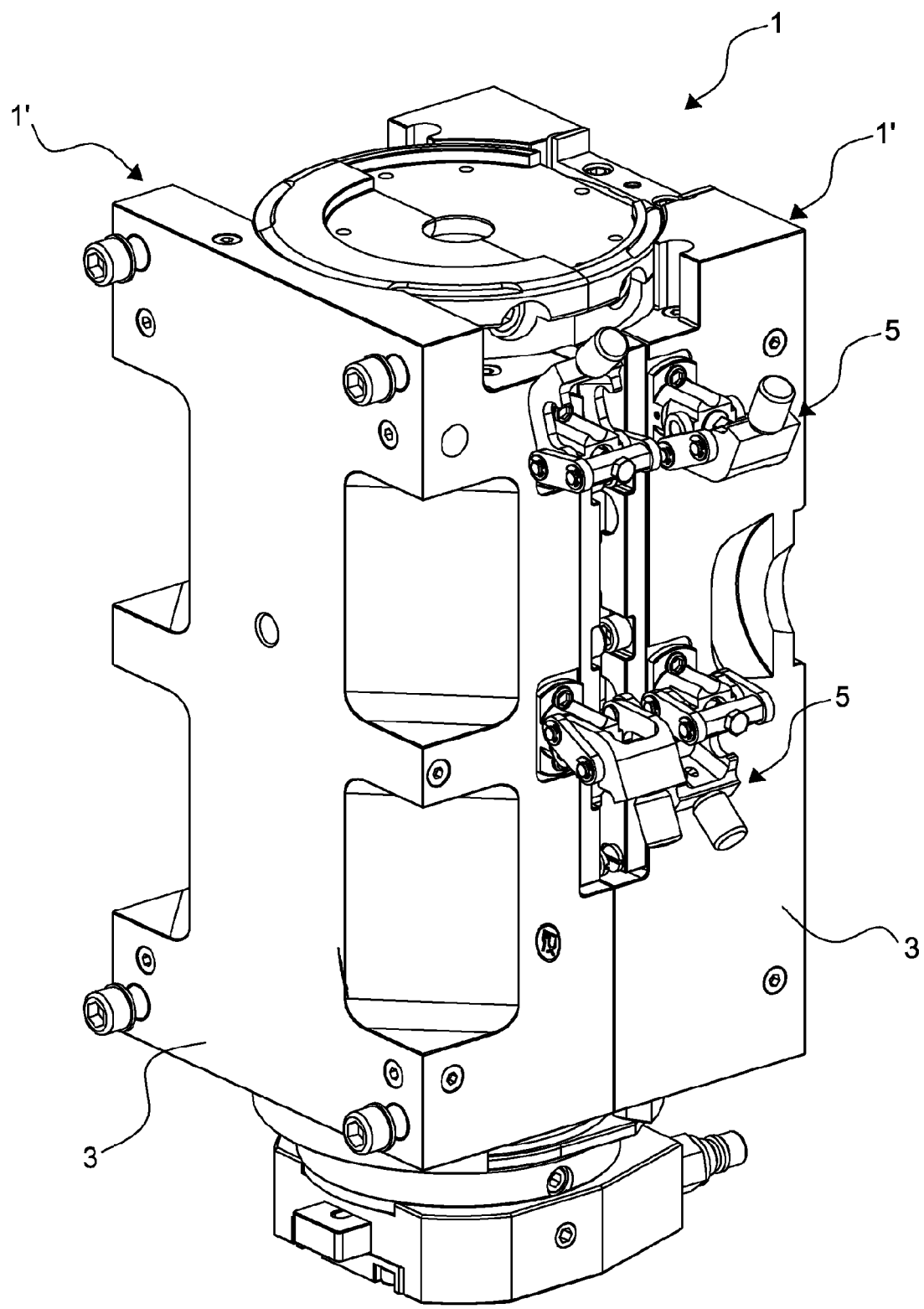
FIG. 1 represents a perspective view of a first embodiment of the blow mould according to the invention.

With reference to the Figures, a blow mould is represented, globally indicated with the reference number 1, for the production of containers, in particular bottles, made of thermoplastic material such as PET, PEN or other suitable material, or mixtures thereof, by means of blow moulding or stretch-blow moulding of preheated preforms.

Blow mould 1 comprises two lateral half-elements 1', each lateral half-element 1' comprising a lateral half-mould 2 supported by a half-mould holder 3. The term half-mould comprises both a lateral half-mould made as a single piece, and a lateral half-mould comprising several pieces placed on top of each other. In the latter case it is possible, by changing just one piece of the half-mould, to vary the height of the containers to be moulded or obtain containers which are slightly different in shape.

Blow mould 1, object of the present invention, comprises two lateral half-moulds 2, each supported by a respective half-mould holder 3, the two half-mould holders 3 being movable with respect to each other. The adjective "lateral" in this description, associated with the terms half-element, half-mould, half-mould holder and half-impression, relates to a side or lateral portion of the container to be blown with respect to the longitudinal axis of the container itself. The definition of lateral half-mould in this description is also maintained in the event that the mould is provided therein with a further element which defines the bottom of the mould, called bottom plate in technical jargon, which is distinct from the two lateral half-moulds. The bottom of the mould comprises the bottom impression of the container to be blown. Said bottom impression of the container and the lateral half-impressions, provided in the half-moulds, define the impression or global figure of the container to be blown in the mould.

Figure 3:
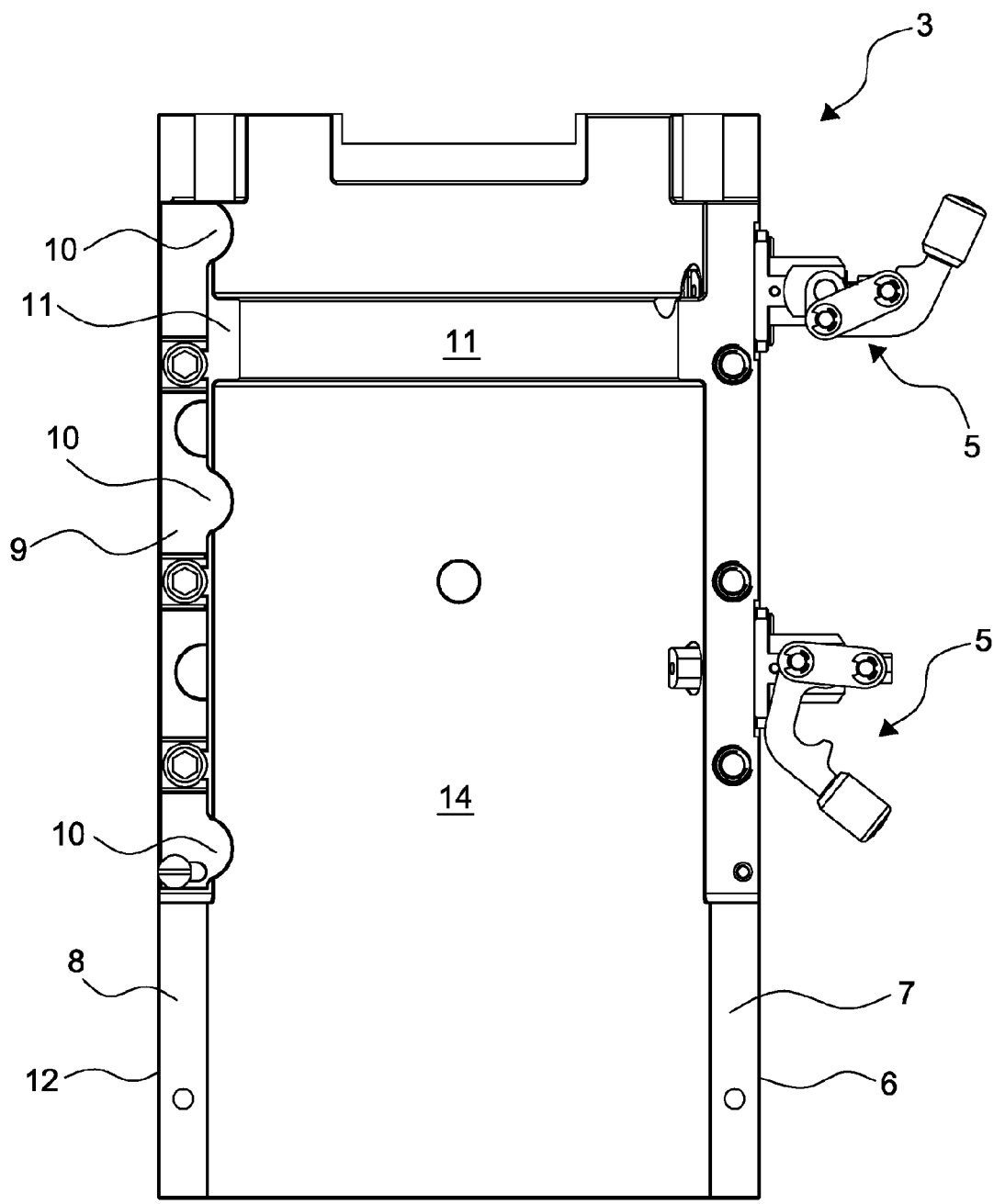
FIG. 3 represents a view of the internal part of a half-mould holder of the blow mould in FIG. 1.
Figure 4B:
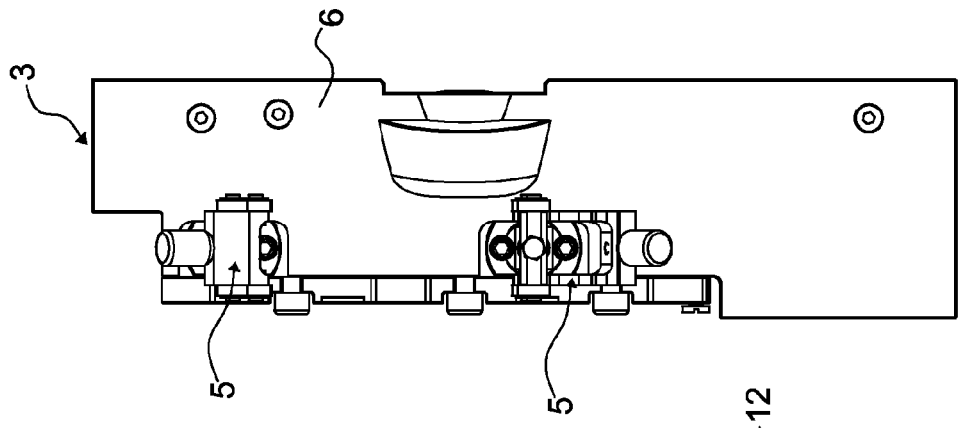
FIGS. 4*a* and 4*b* represent side views of the external part of the half-mould holder in FIG. 4.
Figure 4:
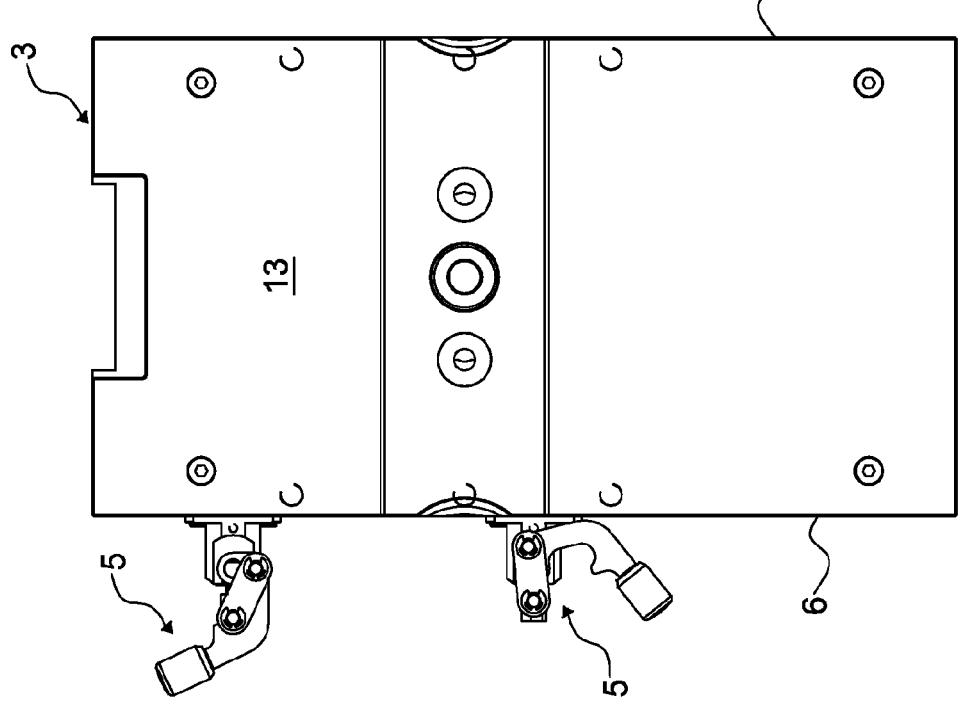
FIG. 4 represents a view of the external part of a half-mould holder of the blow mould in FIG. 1.
Figure 4A:
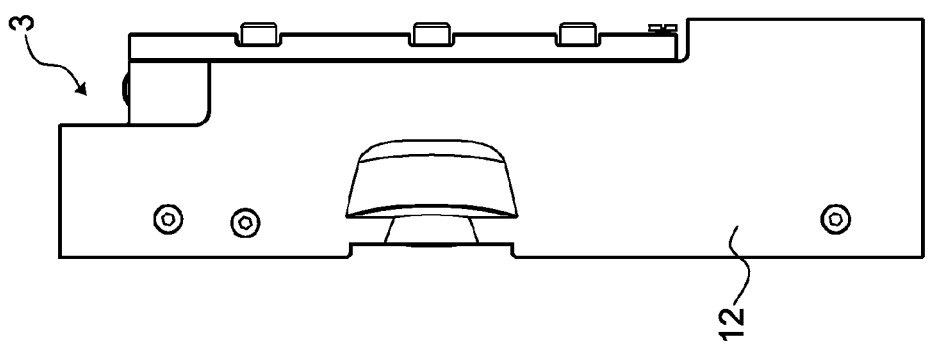

Each half-mould holder 3 is provided with (FIGS. 3 to 5):

an external surface thereof comprising a first lateral wall 6, a second lateral wall 12 substantially parallel to said first wall 6, and a third lateral wall 13 connecting said first wall 6 to said second wall 12;

and an internal surface thereof comprising the contact walls 7, 8 of half-mould holder 3 and an internal wall 14, which is substantially semi-cylindrical, connecting said contact walls 7, 8.

Figure 2:
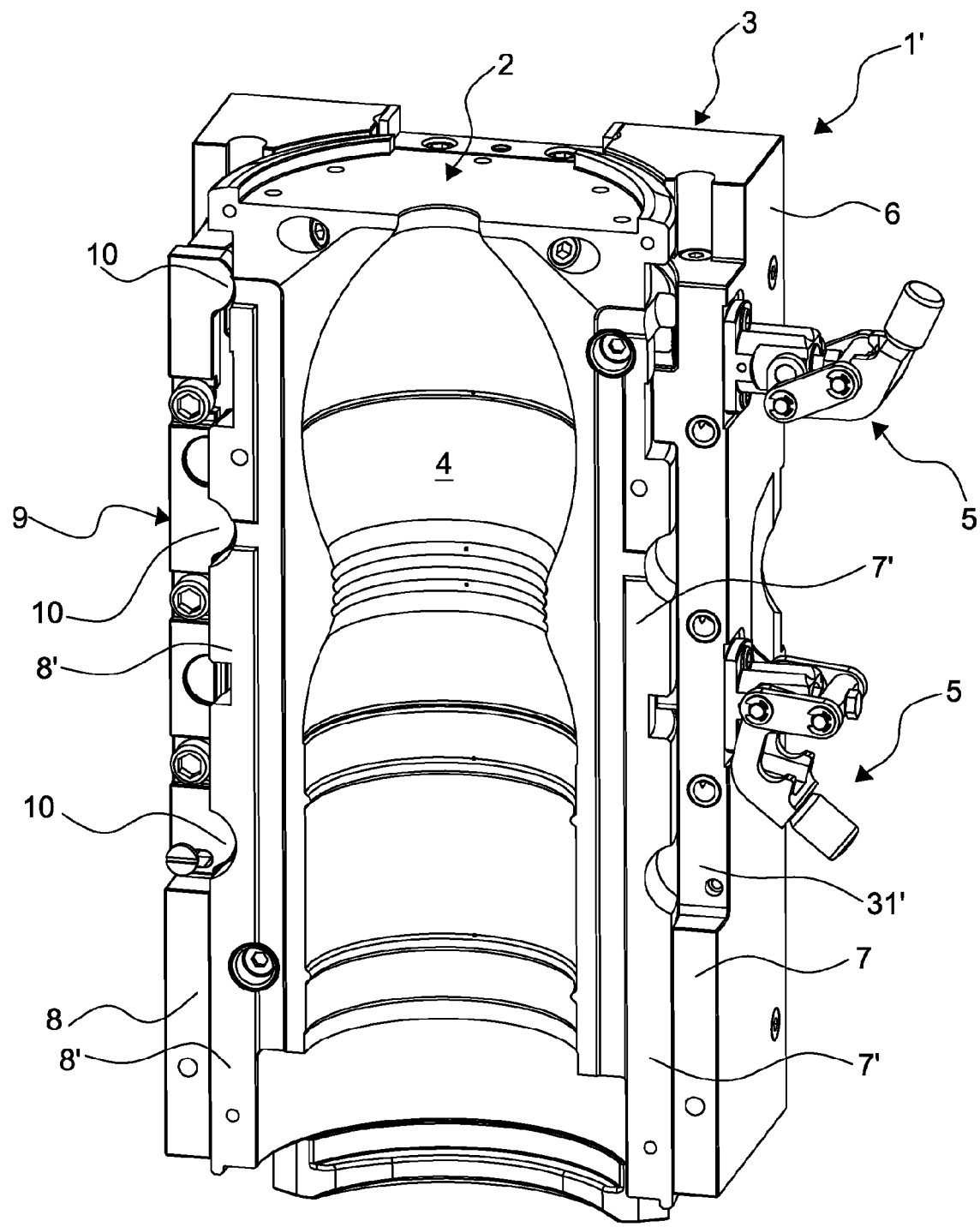
FIG. 2 represents a perspective view of a part of the blow mould in FIG. 1.

Each lateral half-mould 2 comprises a substantially semi-cylindrical external surface thereof (not shown) and an internal surface thereof comprising (FIG. 2) the contact walls 7', 8' of half-mould 2 and an internal cavity defining the lateral half-impression 4 of the container to be moulded.

The internal wall 14 of half-mould holder 3 and the external surface of half-mould 2 are of substantially complementary shape so as to enter in contact at least partially with each other for purposes of heat conduction and mechanical connection. Therefore, said internal wall 14 of half-mould holder 3 and said external surface of half-mould 2 define respective coupling surfaces between half-mould holder and half-mould, which are at least partially complementary to each other.

The ducts for the circulation of cooling and/or heating fluids for the half-impressions are generally provided in the half-mould holders 3. This allows the disconnection and subsequent re-connection of the respective pipe joints, to which said ducts are connected, to be avoided, when it is necessary to carry out the replacement of the half-moulds.

However, in alternative variants, the ducts for the circulation of cooling and/or heating fluids for the half-impressions may also or exclusively be provided in the half-moulds 2.

In the event that the blow mould, object of the present invention, is also provided therein with a mould bottom, called bottom plate in technical jargon, which is distinct from the two lateral half-moulds 2, the ducts for the circulation of cooling and/or heating fluids may also be provided in said bottom plate.

Advantageously, axial mutual positioning means for half-mould 2 and half-mould holder 3 are provided. In particular, at least one semi-annular protuberance 11 can be provided on the internal wall 14 of half-mould holder 3 to which at least one respective semi-annular recess corresponds in the external surface of half-mould 2, or vice versa, in order to facilitate the insertion of the half-mould into the half-mould holder by means of a rotary motion of said half-mould about a longitudinal axis thereof. In a variant (not shown), two semi-annular protuberances and two respective semi-annular recesses may be provided.

On the opposite side to where the insertion of the half-mould into the half-mould holder begins, at least one stop element 10 is further provided in order to correctly align the contact wall 8' of half-mould 2 with the contact wall 8 of half-mould holder 3. In the example in FIG. 3, there is provided a plate 9, fixed to the contact wall 8 of half-mould holder 3, from which three stop elements 10 protrude internally.

Each lateral half-mould 2 is detachably locked to the respective half-mould holder 3 by means of at least one quick coupling device, described in detail below, fixed together with all components thereof to said half-mould holder 3.

In the event that the half-mould holders are rotationally hinged to each other by means of a vertical oscillation pin, to form a "jackknife" or "book-type" mould, said at least one stop element 10 is provided on each half-mould holder on the side of the oscillation pin of the half-mould holders, while at least one quick coupling device is arranged on the opposite side.

Advantageously, the quick coupling device comprises a locking element and a force multiplier mechanism, incorporating a first lever, in order to multiply a first force applicable on said first lever and obtain a second force, greater than the first force, in order to lock the respective half-mould and half-mould holder. Said force multiplier mechanism is configured so as to move said locking element until it interacts with half-mould 2 whereby the respective half-mould and half-mould holder are locked to each other in a position in which the respective complementary coupling surfaces are coupled to each other.

Said force multiplier mechanism is configured so as to actuate the respective locking element from an unlocking position, in which half-mould 2 can be extracted from half-mould holder 3, to a locking position, in which half-mould 2 and half-mould holder 3 are integrally locked to each other, or vice versa.

Figure 5:
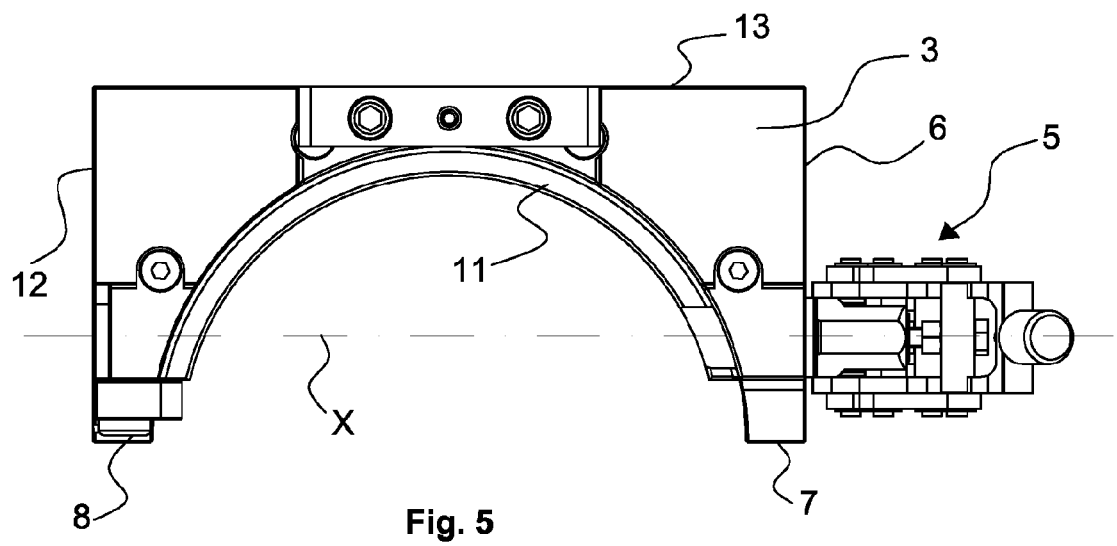
FIG. 5 represents a top view of the half-mould holder in FIG. 4.
Figure 6:
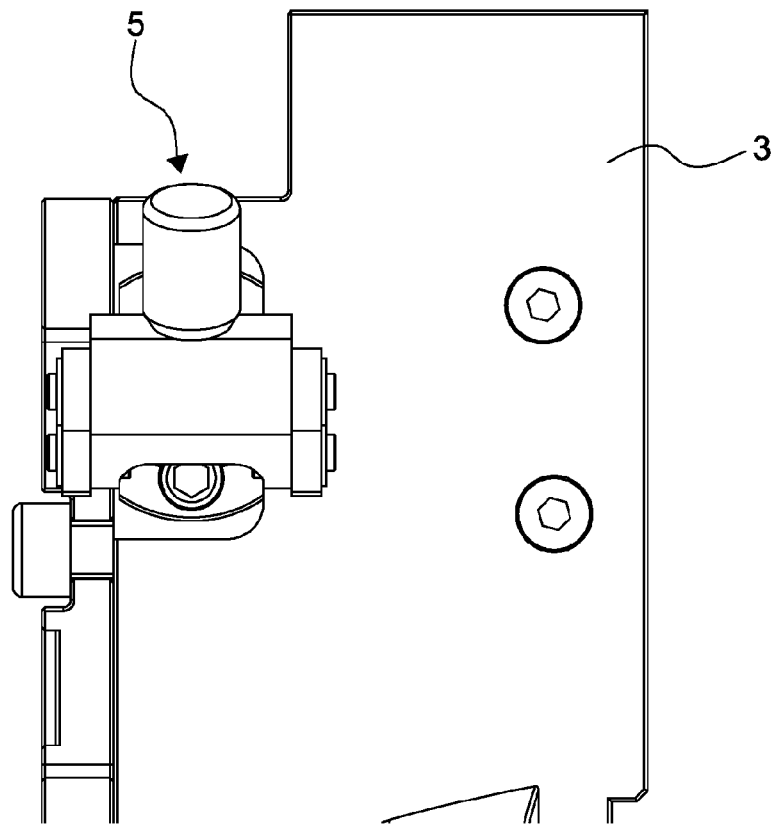
FIG. 6 represents an enlargement of part of the view in FIG. 4*b*.
Figure 14A:
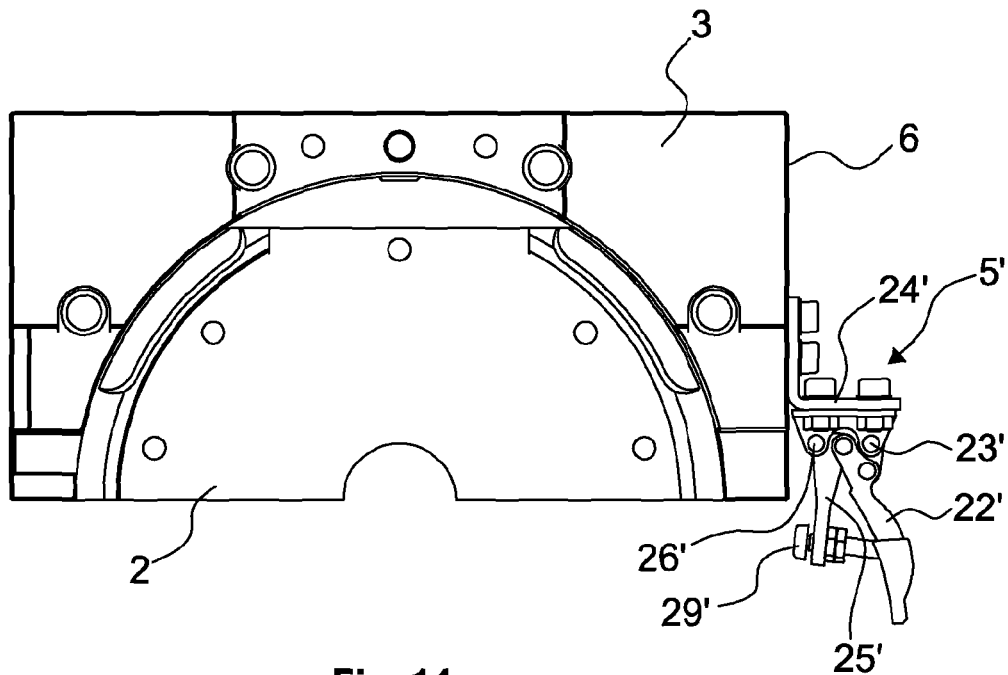
FIGS. 14*a* and 14*b* represent top views of half-mould holder and relative half-mould visible in FIG. 12.
Figure 14B:
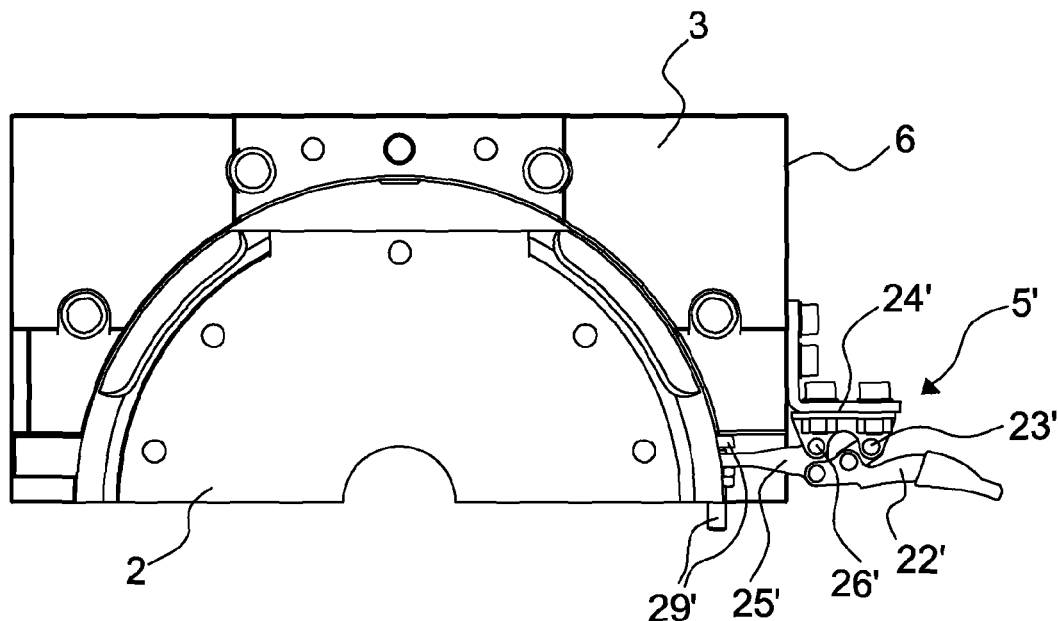

The quick coupling device is integral with first lateral wall 6 of the external surface of half-mould holder 3 and is fixed to said first lateral wall 6 at a predetermined distance, other than zero, from the corresponding contact wall 7 of the same half-mould holder 3, adjacent to said first wall 6 (FIGS. 5 and 14).

In a first preferred embodiment of the invention, the locking element is a bolt or slider 29, actuable by the force multiplier mechanism, which moves along a locking axis X, visible in the example shown in FIG. 5, parallel and suitably spaced from the contact plane on which the contact walls 7, 8 lie. In a variant (not shown) said force multiplier mechanism may be configured so that the bolt moves along a longitudinal axis which is not parallel to the plane defined by the contact walls 7, 8. In the example in FIGS. 1 to 10, two quick coupling devices are provided for each half-mould holder 3. However, the option to provide only one quick coupling device for each half-mould holder 3 is not excluded.

The bolt may be of various shapes and the cross-section thereof may be round, oval, quadrangular, triangular, for example.

In a similar way to the bolt of a lock which, emerging from the door leaf upon turning of the key, interacts with the other door leaf or with the doorpost thus stopping the door, the bolt or slider 29 of the quick coupling device, actuated by the force multiplier mechanism, emerges from half-mould holder 3 through an opening, preferably but not necessarily a through-hole 31, provided in the thickness of the half-mould holder 3, in order to interact with the coupling surface of the respective half-mould 2 whereby the respective half-mould and half-mould holder are locked to each other.

The bolt, which is a retaining device, may be constituted, for example, by a pin or wedge or push rod or a presser member, such as a pressure screw or another appropriate element which can pass through the first wall 6 by means of a respective opening, obtained therein, until arriving in the locking position in which it interacts with a portion of the external surface of the half-mould 2, determining the locking of the half-mould to the mould holder by interlocking or by friction.

According to a first advantageous variant, the locking takes place by means of providing a seat or recess 20 (FIG. 8*a*) in a portion of the coupling surface of half-mould 2, said seat or recess 20 having a suitable shape to accommodate an end of said bolt in the shape of a pin or wedge or push rod, for example. For every force multiplier mechanism, and therefore for every bolt, a corresponding seat will be provided in the external coupling surface of the half-moulds, said seat having a suitable shape to guarantee locking without clearances.

The locking may also take place, in a second advantageous variant, without providing any seat or recess in the external coupling surface of the half-mould 2, having a shape specially designed to accommodate an end of said bolt. Indeed, when using a presser member, such as a pressure screw, as a bolt, this special seat is not necessary. Indeed, the multiplying of the force applied on the first lever 22 enables a greater force to be obtained which will be exerted by the presser member on a portion of the external coupling surface of the half-mould, ensuring the locking of the half-mould by friction.

By way of example, a variant of the quick coupling device, suitable for said first preferred embodiment of the invention, is shown in the FIGS. 7*a* to 10. In this case, the force multiplier mechanism comprises a horizontal locking system with hinged levers 5, configured so that the bolt is made to move in a horizontal direction from the unlocking position to the locking position, or vice versa.

Said horizontal locking system with hinged levers or linkage 5 in turn comprises:
- a support structure 24 fixed to the lateral wall 6 of half-mould holder 3;
- a first control lever 22, hinged at a first end thereof on first pins 23 protruding from two opposite sides of said support structure 24;
- a pair of second levers 25, arranged parallel to each other and hinged at a first end thereof on respective second pins 26 integral with said first lever 22 at the first end thereof, and integrally hinged at a second end thereof on a third transversal pin 28 which connects said second levers 25 to each other;
- a bolt in the shape of a fourth longitudinal pin 29, integrally fixed to said third transversal pin 28 and positioned longitudinally at a through-hole 31 provided in first wall 6 of mould-holder 3.

In the external surface of half-mould 2, a seat or recess 20 is provided so as to accommodate an end of said fourth longitudinal pin 29 when it reaches the locking position.

Figure 9:
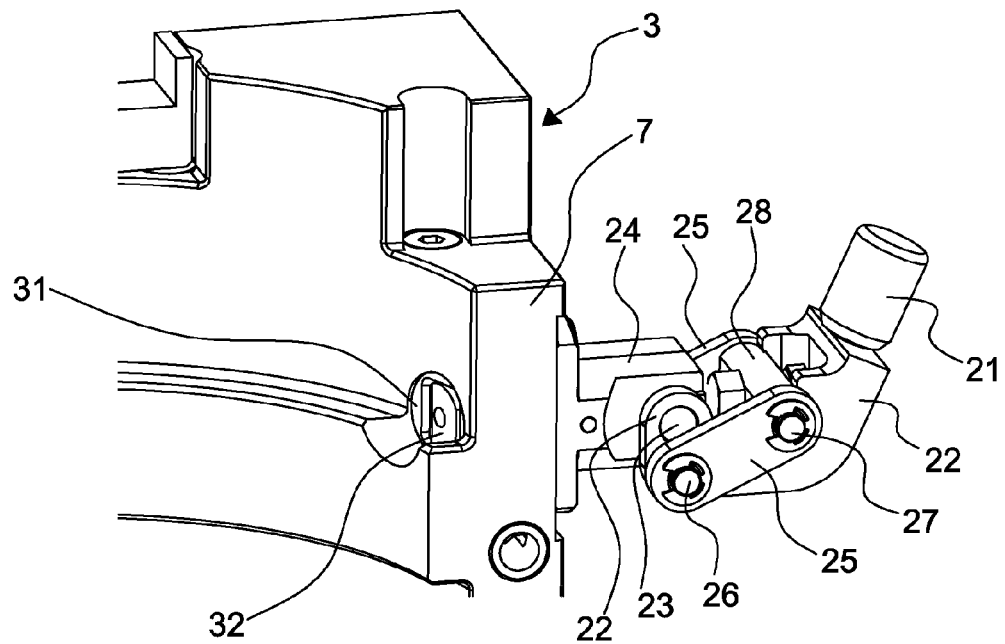
FIG. 9 represents a perspective view of a first component of the half-mould holder in FIG. 3.

FIG. 9 shows a linkage 5 in the unlocking position in which the half-mould (not shown) can be extracted from the half-mould holder 3 by means of a rotary motion about the longitudinal axis thereof in the opposite direction to the rotary motion in the insertion step. The front end 32 of bolt 29 is in fact within through-hole 31 and does not interfere with the half-mould (not shown).

Figure 7:
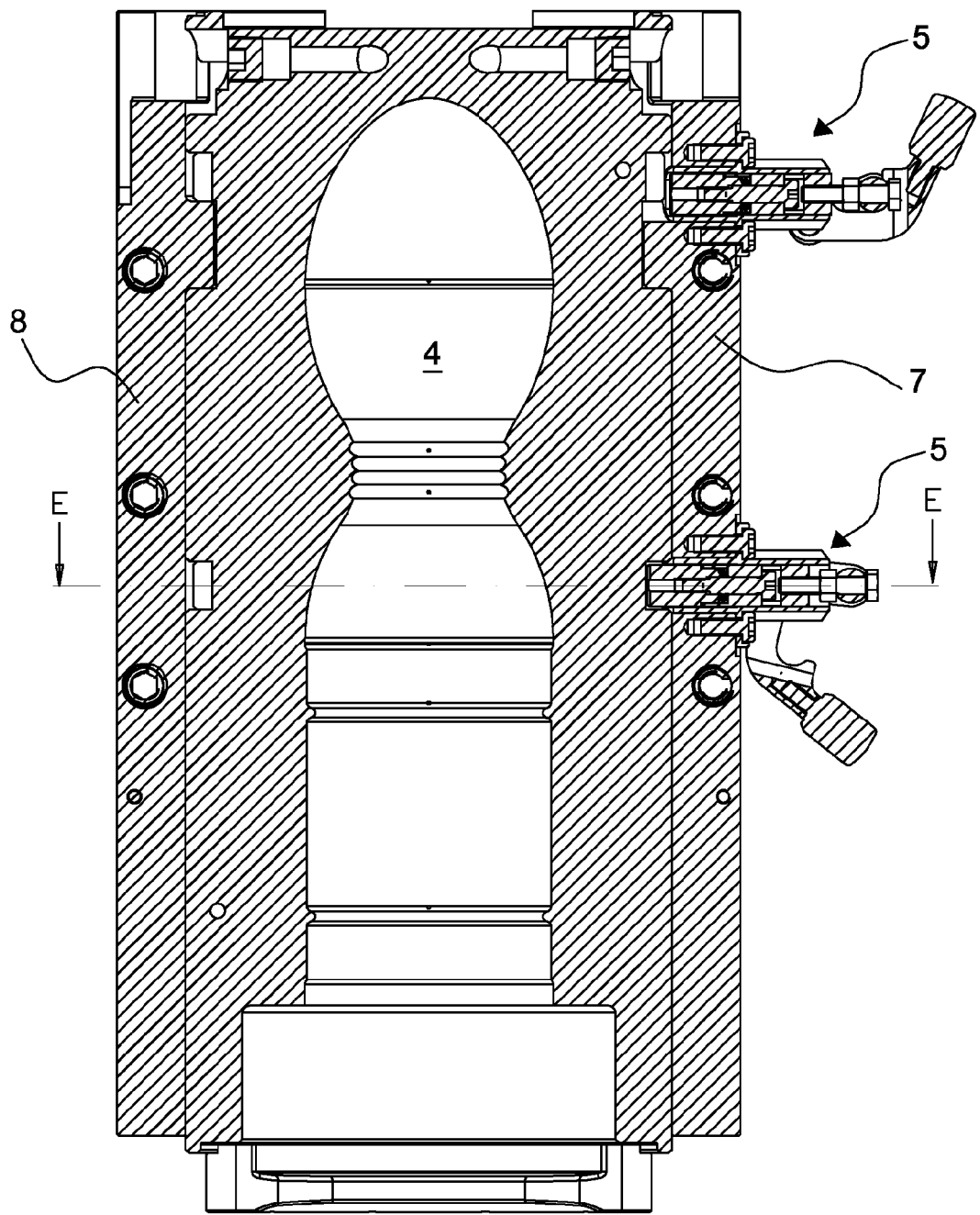
FIG. 7 represents a section view of half-mould holder and half-mould.
Figure 7A:
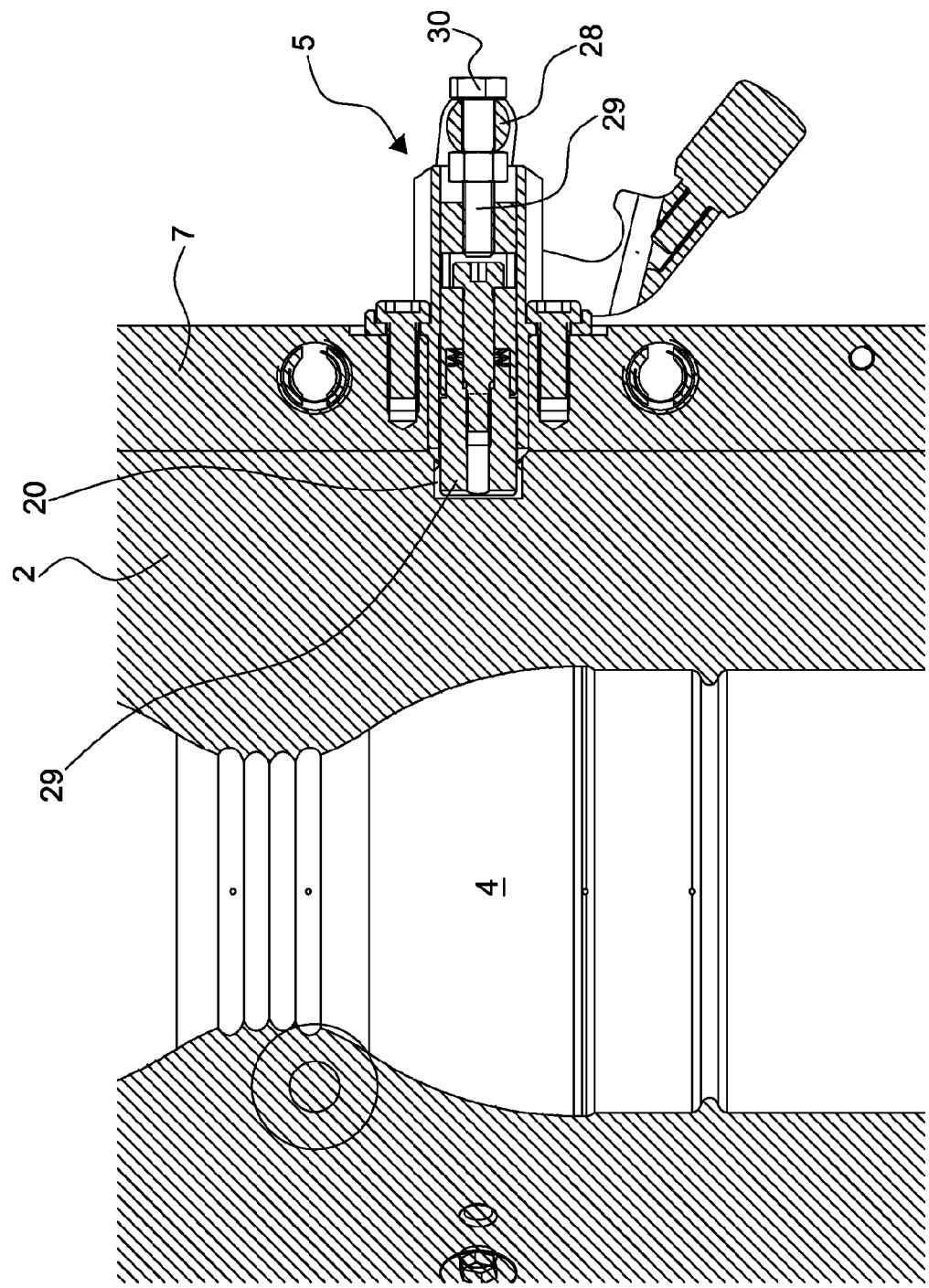
FIG. 7*a* represents an enlargement of part of the view in FIG. 7.
Figure 7B:
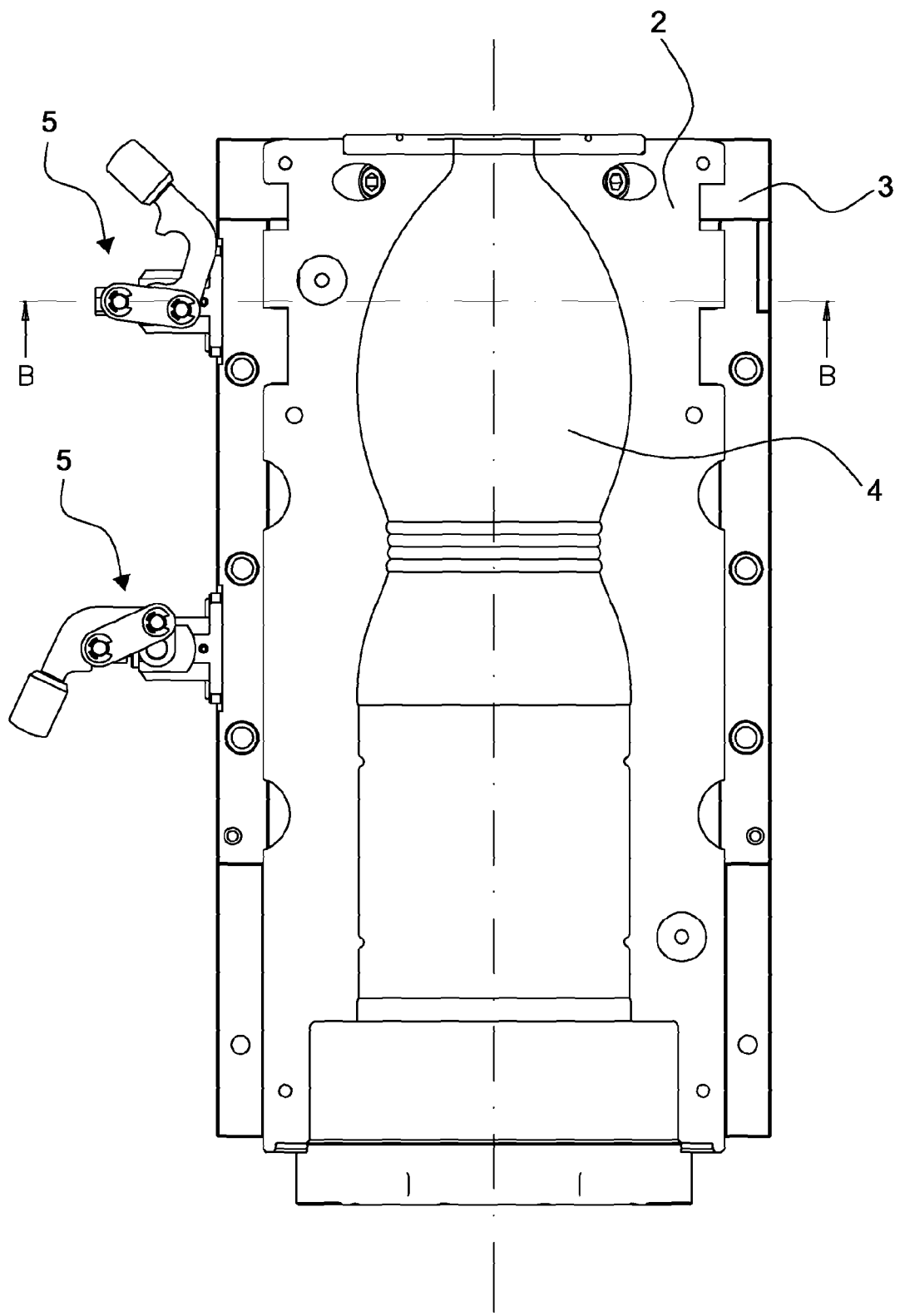
FIG. 7*b* represents a frontal view of half-mould holder and half-mould.
Figure 10:
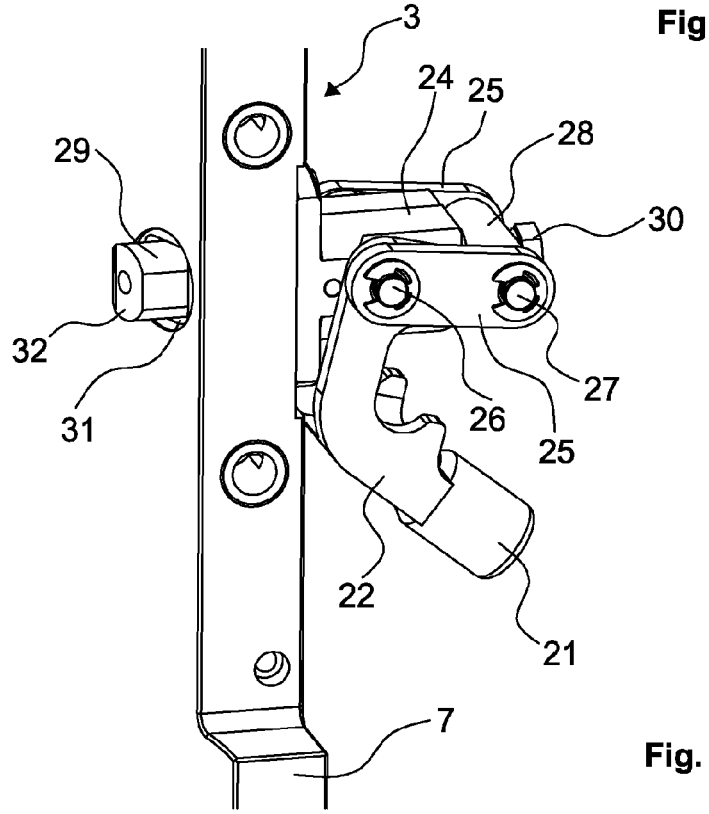
FIG. 10 represents a perspective view of a second component of the half-mould holder in FIG. 3.

FIG. 10 shows a linkage 5 in the locking position in which the half-mould (not shown) and half-mould holder 3 are integrally locked to each other. Indeed, front end 32 of bolt 29 emerges from through-hole 31 and is inserted into seat 20 of half-mould 2, as shown in FIGS. 7a and 8a.

Figure 8A:
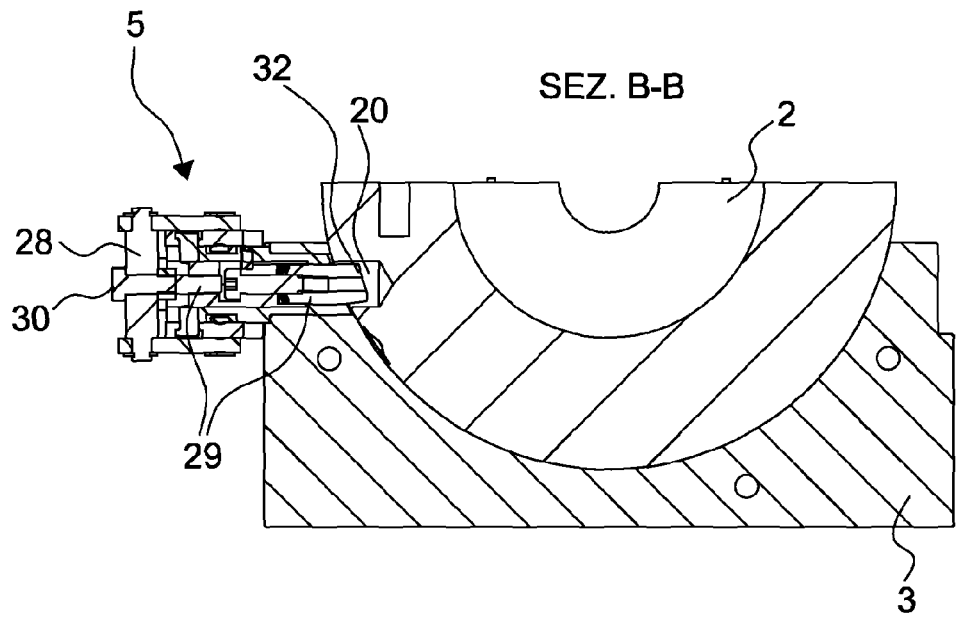
FIG. 8*a* represents a section view of half-mould holder and half-mould in FIG. 7*b* along the plane B-B.

With reference to the section in FIG. 8a, seat 20 is provided by means of milling, defining a localized seat in the external surface of half-mould 2.

Figure 8B:
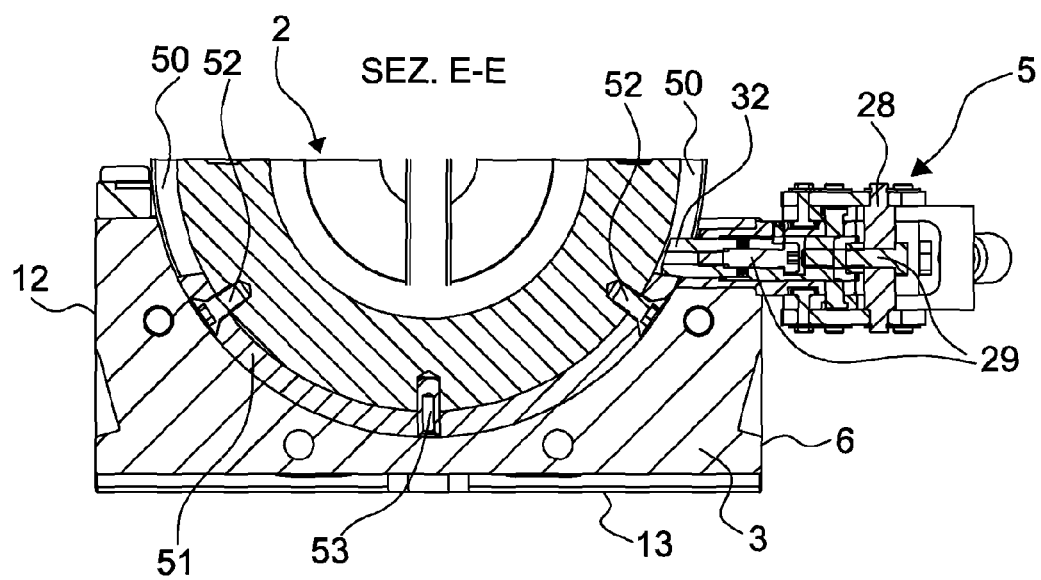
FIG. 8*b* represents a section view according to the plane E-E of the half-mould holder and the half-mould in FIG. 7.

With reference to the section in FIG. 8b, a variant provides for a semi-annular groove 50 in the external surface of half-mould 2, made in a lathe, into which a semi-annular plug 51 is inserted which, once fixed by means of screws 52 and/or pin 53 to half-mould 2, defines a guide tooth for the substantially wedge-shaped end 32 of bolt 29. Said alternative solution has the advantage that, in the event of wear to the guide tooth, it is possible to simply replace only the semi-annular plug rather than the entire half-mould.

The bolt in the shape of fourth longitudinal pin 29, in the example in FIGS. 9 and 10, passes through the third transversal pin 28 by means of an appropriate hole obtained thereon, and is integrally fixed to said third transversal pin 28 by means of a nut 30 screwed onto the threaded end of pin 29 protruding from said third pin 28.

In passing from the unlocking position (FIG. 9) to the locking position (FIG. 10), the first lever 22 is moved, e.g. manually, acting with a first force on a grip 21 which may be provided thereon. The rotation movement of first lever 22 sets the pair of second levers 25 in motion about the second pin 26 and, in turn, sets in motion the third transversal pin 28 which will push with a second force, greater than the first force, fourth longitudinal pin 29 towards the inside of the mould until it is inserted into the respective seat 20 of half-mould 2. Once the longitudinal pin 29 reaches the locking position, the control lever 22 remains locked due to the aforementioned linkage reaching the toggle configuration.

In order to unlock the half-mould holder/half-mould group it will be necessary to again apply a force, in the opposite direction to said first force, on the control lever 22.

In alternative to the fourth longitudinal pin 29, the bolt may be a presser member, such as a pressure screw. In this case, locking between half-mould and half-mould holder takes place by friction between the bolt, which passes through half-mould holder 3, and the coupling surface of half-mould 2, thus without the necessity to provide a special seat or recess to accommodate the end of the bolt.

In a second preferred embodiment of the invention, shown in the FIGS. 11 to 14, the locking element 29', actuable by the force multiplier mechanism, moves substantially along a circumference arc, preferably on a substantially horizontal plane.

Figure 11A:
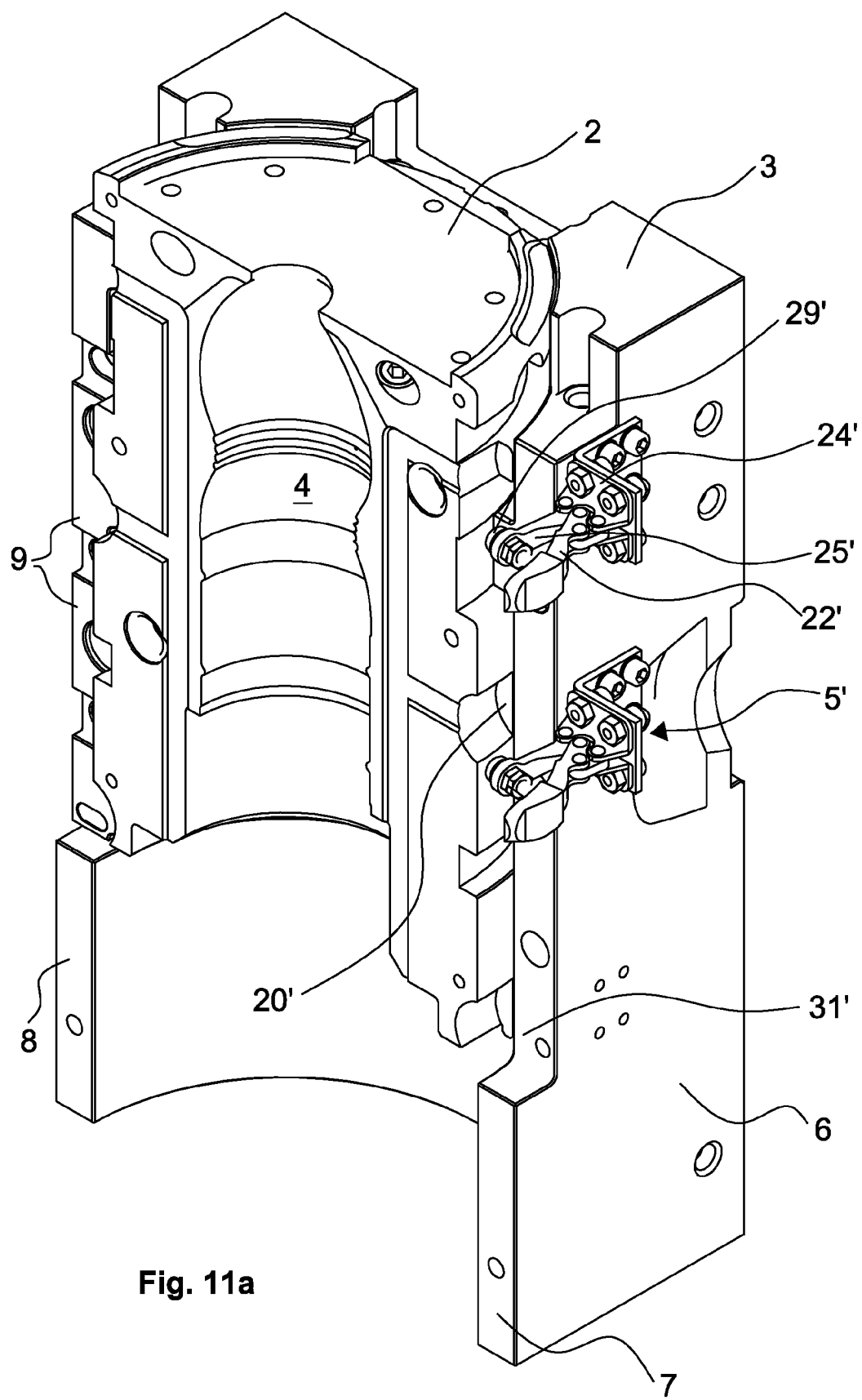
FIGS. 11*a* and 11*b* represent perspective views of parts of a second embodiment of the blow mould according to the invention.
Figure 11B:
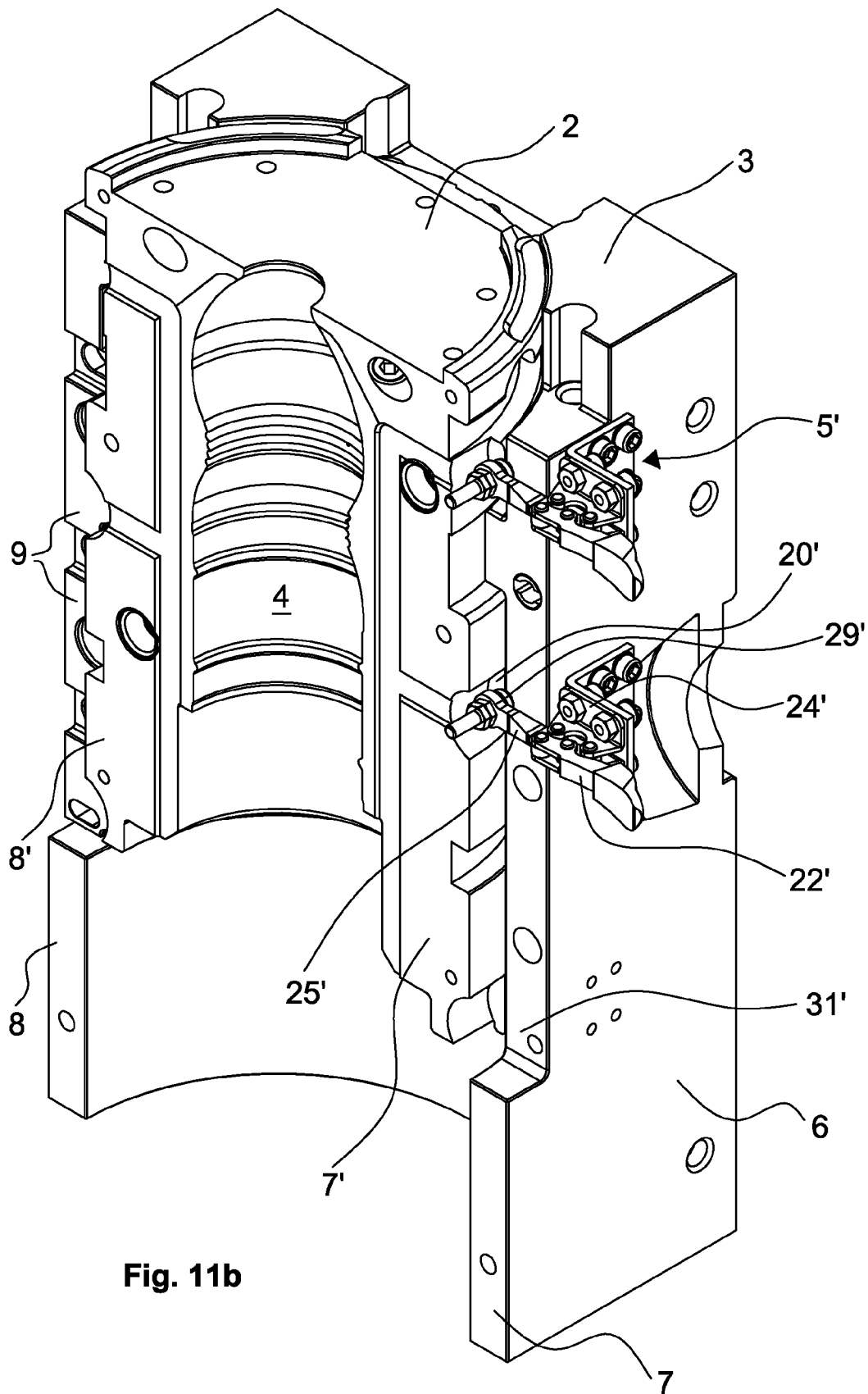
Figure 12:
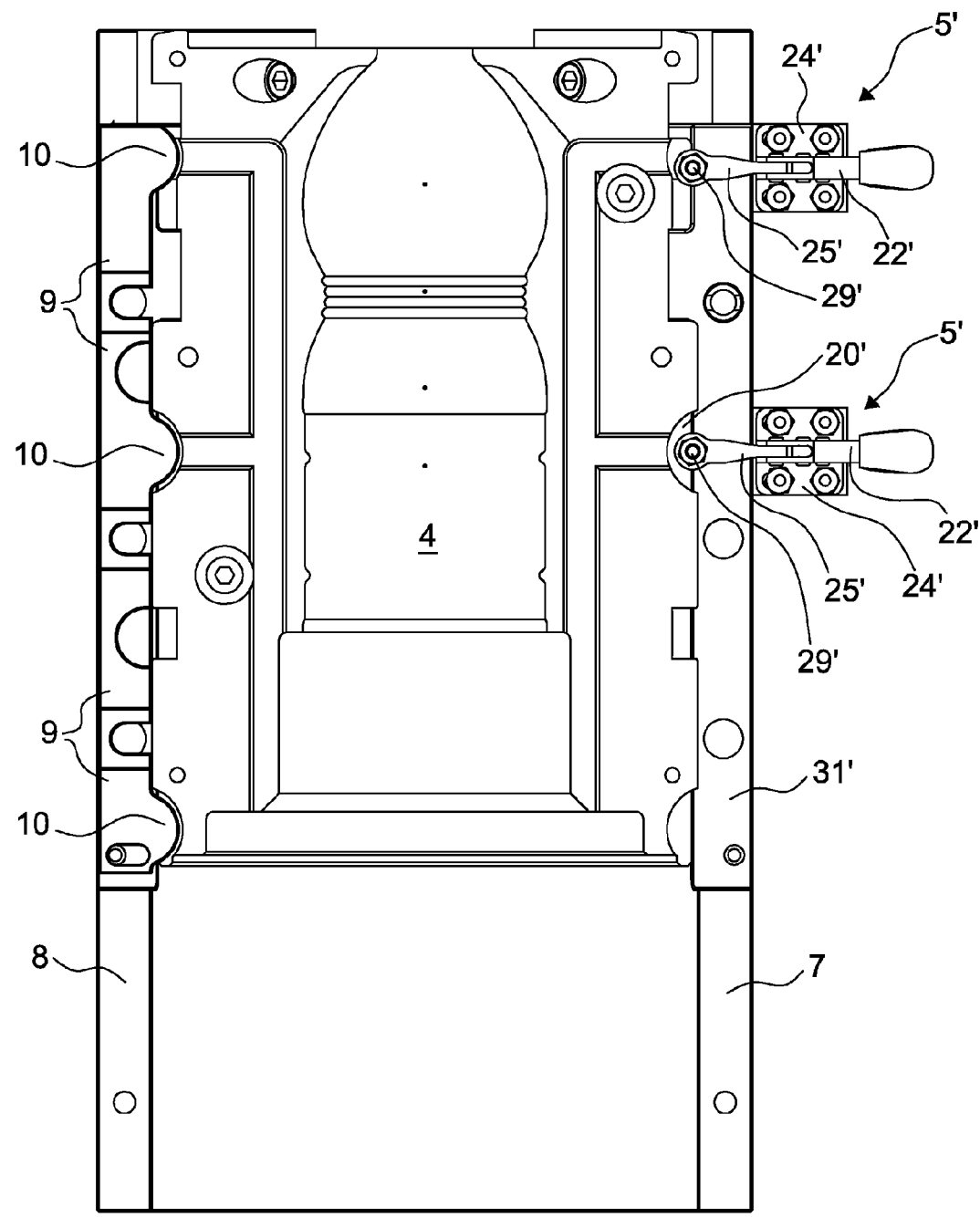
FIG. 12 represents a frontal view of the internal part of the blow mould in FIG. 11*b*.
Figure 13:
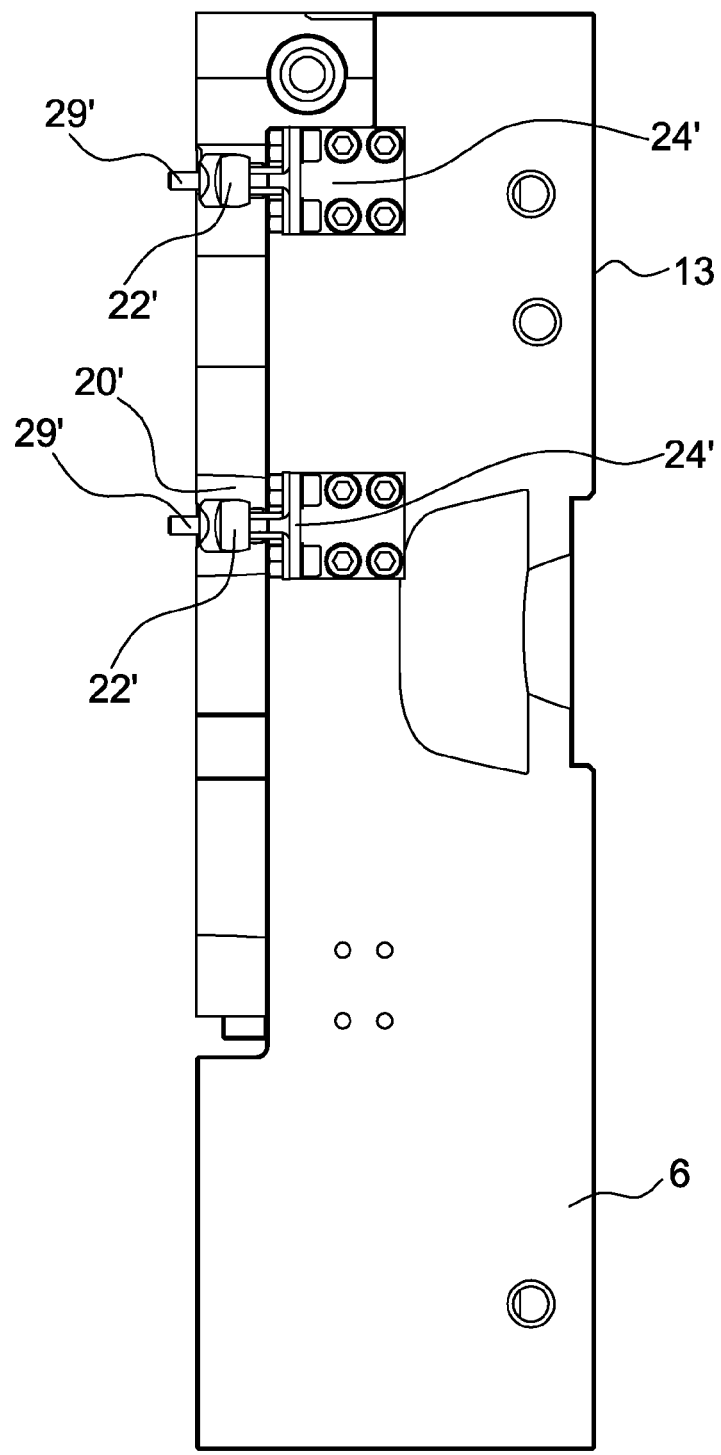
FIG. 13 represents a side view of the external part of the half-mould holder visible in FIG. 12.

In the example in the FIGS. 11 to 13, two quick coupling devices are provided for each half-mould holder 3. The option of providing at least three quick coupling devices for each half-mould holder 3 is contemplated. A single quick coupling device may also be provided for each half-mould holder 3.

Locking element 29' of the quick coupling device, actuated by the force multiplier mechanism, moves along a circumference arc until it interacts with a corresponding flat surface formed in part by a portion of the half-mould and in part by a portion of the half-mould holder.

In particular, locking element 29' is inserted into a recess 31', provided in the contact wall 7 of half-mould holder 3, until it interacts with half-mould 2 whereby the respective half-mould and half-mould holder are locked to each other, determining the locking of the half-mould to the mould holder by friction.

The locking may take place (FIG. 12) by means of providing a seat or recess 20' in a portion of the contact wall 7' of half-mould 2, said seat or recess 20' having a suitable shape to accommodate at least part of one end of said locking element in the shape of a pin or wedge or push rod, for example. For every force multiplier mechanism, and therefore for every locking element, a corresponding seat may be provided in the contact wall of the half-moulds, said seat having a suitable shape to ensure locking without clearances.

FIG. 11a shows a linkage 5' in the unlocking position in which the half-mould 2 can be extracted from the half-mould holder 3 by means of a rotary motion about the longitudinal axis thereof in the opposite direction to the rotary motion in the insertion step.

FIG. 11b shows a linkage 5' in the locking position in which half-mould 2 and half-mould holder 3 are integrally locked to each other. Indeed, the front end of locking element 29' is inserted into a recess 20' of half-mould 2 and into the recess 31' of half-mould holder 3.

An alternative variant (not shown) of this second embodiment of the invention provides that the locking element 29' of the quick coupling device, actuated by the force multiplier mechanism, moves along a circumference arc until it interacts with a corresponding flat surface provided exclusively on the half-mould.

In particular, the locking element 29' enters into contact with a portion of flat surface of the contact wall 7' of half-mould 2, determining the locking of the half-mould to the mould holder by friction, or it is inserted into a seat or recess, provided in the contact wall 7' of half-mould 2, whereby the respective half-mould and half-mould holder are locked to each other, determining the locking of the half-mould to the half-mould holder by interlocking. The seat has a suitable shape to accommodate an end of said locking element in the shape of a pin or wedge or push rod, for example. For every force multiplier mechanism, and therefore for every locking element, a corresponding seat will be provided in the contact wall of the half-moulds, said seat having a suitable shape to guarantee locking without clearances.

In this second embodiment, the locking element, which is a retaining device, may also be, for example, a pin or wedge or push rod or a presser member, such as a pressure screw or another appropriate element. The locking element may be of various shapes and the cross-section thereof may be round, oval, quadrangular, triangular, for example. The possible seat or recess may have a form which at least partially corresponds to that of the cross-section of the locking element.

By way of example, an embodiment of the quick coupling device, suitable for said second preferred embodiment of the invention, is shown in the FIGS. 11 to 14. In this case, the force multiplier mechanism comprises a horizontal locking system with hinged levers 5', (or horizontal toggle locking system), or simply linkage, of the arc movement type, i.e. configured so that the locking element moves on a horizontal plane along a circumference arc from the unlocking position to the locking position, or vice versa.

In the example shown in the Figures from 11 to 14, the linkage 5' is the model 205-Standard by DESTACO (205-U—Horizontal Hold-Down Toggle Locking Clamp), which is available on the market.

Said locking system is configured so that, when the operator exerts a first force on first control lever 22', said force is multiplied obtaining a second force, denominated locking force, which is much greater than said first force, in order to safely lock the half-mould 2 with the relative half-mould holder 3.

In passing from the unlocking position (FIG. 14a) to the locking position (FIG. 14b) first lever 22' is moved manually, acting with a first force. The rotation movement of first lever 22' about first pin 23' sets second lever 25' in motion, which rotates about second pin 26'. First lever 22' and second lever 25' are hinged to each other and to the support structure 24', fixed to the sidewall 6 of half-mould holder 3, so as to obtain a second force, of greater intensity than the first force, so that the locking element 29' which moves through a circumference arc enters into contact with a portion of flat surface provided in the only contact wall 7' of half-mould 2 or provided in part on contact wall 7' of half-mould 2 and in part on contact wall 7 of half-mould holder 3. In this way, locking takes place by friction.

A seat or recess 20' may also be provided, obtained on contact wall 7' or also on contact wall 7, in order to specially accommodate an end of locking element 29'. In this way, instead, locking takes place by interlocking.

In the locking step (FIG. 14b), once the locking element 29' reaches the locking position, the first control lever 22' remains locked due to the aforementioned linkage reaching the toggle configuration.

In order to unlock the half-mould holder/half-mould group it will be necessary to again apply a force, in the opposite direction to the first force, on control lever 22'.

In alternative, any other horizontal locking system with hinged levers which has a similar method of operation may be used, including ones which are commercially available.

With this second embodiment of the invention, once the locking position has been reached by the quick coupling device 5', the two lateral half-elements 1' of the blow mould can be closed. Advantageously at each quick coupling device 5' on a first lateral half-element 1', there is provided an appropriate recess on the corresponding second lateral half-element (not shown) in order to accommodate the part of linkage 5' which, in the locking position (FIG. 14b), protrudes from the contact walls 7, 7' of half-mould holder and half-mould 2.

More generally, the force multiplier mechanism of every quick coupling device may comprise, for example, horizontal locking systems with hinged levers of the arc movement type with control lever parallel or inclined with respect to the locking axis, or horizontal locking systems with hinged levers of the rectilinear movement type with control lever inclined with respect to the locking axis, or vertical locking systems with hinged levers of the type with horizontal or vertical control lever.

Advantageously, the quick coupling system of the blow mould of the present invention may be applied to blow moulds both with vertical oscillation pin of the half-mould holders ("jackknife-type" mould) and with horizontal oscillation pin of the half-mould holders.

It can further be applied to blow moulds comprising two or more impressions of containers to be moulded.

The invention claimed is:

1. A blow mould for plastic containers comprising
at least two half-moulds,
at least two half-mould holders, each half-mould holder supporting one of said half-moulds, each half-mould holder and each half-mould defining respective complementary coupling surfaces between half-mould holder and half-mould,
at least one quick coupling device to lock each half-mould to the respective half-mould holder,
wherein said at least one quick coupling device is fixed to the respective half-mould holder and comprises one locking element and one force multiplier mechanism, said force multiplier mechanism comprising a locking system with hinged levers, having a first lever firmly hinged to the respective half-mould holder,
wherein said locking element is a bolt that can move, by actuating said force multiplier mechanism, from an unlocking position to a locking position by emerging from the half-mould holder through a through hole provided in the thickness of the half-mould holder, to interact with the coupling surface of the respective half-mould, whereby half-mould and respective half-mould holder are locked to each other in a position in which the respective complementary coupling surfaces are coupled to each other,
and wherein said force multiplier mechanism remains kinematically fixed to the quick coupling device both in said unlocking position and in said locking position.

2. The blow mould according to claim 1, wherein said first lever is hinged to a support structure integrally fixed to a sidewall of the half-mould holder.

3. The blow mould according to claim 1, wherein said locking system with hinged levers is configured so as to move the bolt along a rectilinear locking axis (X).

4. The blow mould according to claim 3, wherein said rectilinear locking axis (X) is substantially parallel and suitably spaced from a plane on which contact walls lie, defining a contact zone of half-mould holder and half-mould with the other half-mould holder and the other half-mould of the blow mould, respectively, when the mould is closed.

5. The blow mould according to claim 1, wherein said bolt is a presser member adapted to exert a pressure on the complementary coupling surface of the half-mould, whereby respective half-mould and half-mould holder are locked by friction to each other.

6. The blow mould according to claim 1, wherein there is provided a seat, obtained on the complementary coupling surface of the respective half-mould, whereby one end of said bolt may be inserted into said seat, thus blocking respective half-mould and half-mould holder by interlocking.

7. The blow mould according to claim 1, wherein two or more quick coupling devices are provided to lock each half-mould to the respective half-mould holder.

8. The blow mould according to claim 1, wherein said bolt is a pin or wedge or push rod or presser member.

\* \* \* \* \*